United States Patent [19]
Tran

[11] Patent Number: 6,101,577
[45] Date of Patent: *Aug. 8, 2000

[54] PIPELINED INSTRUCTION CACHE AND BRANCH PREDICTION MECHANISM THEREFOR

[75] Inventor: Thang M. Tran, Austin, Tex.

[73] Assignee: Advanced Micro Devices, Inc., Sunnyvale, Calif.

[ * ] Notice: This patent is subject to a terminal disclaimer.

[21] Appl. No.: 08/929,767

[22] Filed: Sep. 15, 1997

[51] Int. Cl.[7] ........................................................ G06F 9/38
[52] U.S. Cl. .......................... 711/125; 711/137; 711/204; 711/213; 712/239; 712/237; 712/238; 712/240
[58] Field of Search ..................................... 711/125, 127, 711/137; 712/207, 233, 237, 238, 239, 240; 395/382

[56] References Cited

U.S. PATENT DOCUMENTS

| | | |
|---|---|---|
| 4,044,338 | 8/1977 | Wolf . |
| 4,453,212 | 6/1984 | Gaither et al. . |
| 4,661,900 | 4/1987 | Chen et al. . |
| 4,807,115 | 2/1989 | Torng . |
| 4,858,105 | 8/1989 | Kuriyama et al. . |
| 4,928,223 | 5/1990 | Dao et al. . |
| 5,129,067 | 7/1992 | Johnson . |
| 5,136,697 | 8/1992 | Johnson . |
| 5,226,126 | 7/1993 | McFarland et al. . |
| 5,226,130 | 7/1993 | Favor et al. . |
| 5,392,443 | 2/1995 | Sakakibara et al. . |
| 5,526,507 | 6/1996 | Hill . |
| 5,557,782 | 9/1996 | Witkowski et al. . |
| 5,619,662 | 4/1997 | Steely, Jr. et al. . |
| 5,732,243 | 3/1998 | McMahan ............................... 711/137 |
| 5,752,259 | 5/1998 | Tran ........................................ 711/125 |
| 5,761,713 | 6/1998 | Lesarte .................................... 711/127 |
| 5,812,838 | 9/1998 | Dhong et al. ............................ 712/239 |
| 5,838,943 | 11/1998 | Ramagopal et al. ..................... 712/216 |

FOREIGN PATENT DOCUMENTS

| | | |
|---|---|---|
| 0259095 | 3/1988 | European Pat. Off. . |
| 0381471 | 8/1990 | European Pat. Off. . |
| 0459232 | 12/1991 | European Pat. Off. . |
| 2263985 | 8/1993 | United Kingdom . |
| 2263987 | 8/1993 | United Kingdom . |
| 2281422 | 3/1995 | United Kingdom . |

OTHER PUBLICATIONS

Intel 1994 Pentium Processor Family User's Manual, vol. 1: Pentium Processor Family Data Book, pp. 2–1 through 2–4.

Michael Slater, "AMD's K5 Designed to Outrun Pentium," Microprocessor Report, vol. 8, No. 14, Oct. 24, 1994, 7 pages.

Sebastian Rupley and John Clyman, "P6: Teh Next Step?," PC Magazine, Sep. 12, 1995, 16 pages.

Tom R. Hafhill, "AMD K6 Takes On Intel P6," BYTE, Jan. 1996, 4 pages.

Patterson et al., *Computer Architecture A Quantitative Approach*, Morgan Kaufmann Publishers, Inc., 1990, pp. 361–363.

*Primary Examiner*—B. James Peikari
*Attorney, Agent, or Firm*—Conley, Rose & Tayon, P.C.; Lawrence J. Merkel

[57] ABSTRACT

A microprocessor includes an instruction cache having a cache access time greater than the clock cycle time employed by the microprocessor. The instruction cache is banked, and access to alternate banks is pipelined. The microprocessor also includes a branch prediction unit. The branch prediction unit provides a branch prediction in response to each fetch address. The branch prediction predicts a non-consecutive instruction block within the instruction stream being executed by the microprocessor. Access to the consecutive instruction block is initiated prior to completing access to a current instruction block. Therefore, a branch prediction for the consecutive instruction block is produced as a result of fetching a prior instruction block. A branch prediction produced as a result of fetching the current instruction block predicts the non-consecutive instruction block, and the fetch address of the non-consecutive instruction block is provided to the instruction cache access pipeline.

33 Claims, 7 Drawing Sheets

PIPELINED INSTRUCTION CACHE AND BRANCH PREDICTION MECHANISM THEREFOR

BACKGROUND OF THE INVENTION

1. Field of the Invention

This invention is related to the field of microprocessors and, more particularly, to instruction caches and branch prediction mechanisms within microprocessors.

2. Description of the Related Art

Superscalar microprocessors achieve high performance by executing multiple instructions per clock cycle and by choosing the shortest possible clock cycle consistent with the design. Conversely, superpipelined microprocessors include a large number of pipeline stages for executing an instruction, such that an extremely short clock cycle may be supported. As used herein, the term "clock cycle" or "clock cycle time" refers to an interval of time accorded to various stages of an instruction processing pipeline within the microprocessor. Storage devices (e.g. registers and arrays) capture their values according to the clock cycle. a For example, a storage device may capture a value according to a rising or falling edge of a clock signal defining the clock cycle. The storage device then stores the value until the subsequent rising or falling edge of the clock signal, respectively. The term "instruction processing pipeline" is used herein to refer to the logic circuits employed to process instructions in a pipelined fashion. Although the pipeline may be divided into any number of stages at which portions of instruction processing are performed, instruction processing generally comprises decoding the instruction, executing the instruction, and storing the execution results in the destination identified by the instruction).

In order to further increase performance, microprocessors typically include one or more caches for storing instructions and data. A cache is a storage device configured onto the same semiconductor substrate as the microprocessor, or coupled nearby. The cache may be accessed more quickly than a main memory system coupled to the microprocessor. Generally speaking, a cache stores data and instructions from the main memory system in cache lines. A cache line comprises a plurality of contiguous bytes. The contiguous bytes are typically aligned in main memory such that the first of the contiguous bytes resides at an address having a certain number of low order bits set to zero. The certain number of low order bits is sufficient to uniquely identify each byte within the cache line, and is referred to herein as the "offset" of the byte within the cache line. The remaining bits of the address form a tag which may be used to refer to the entire cache line. As used herein, the term "address" refers to a value indicative of the storage location within main memory corresponding to one or more bytes of information.

Caches may be organized into a "set-associative" structure. In a set-associative structure, the cache lines are accessed as a two-dimensional array having rows and columns. When a cache is searched for bytes residing at an address, a number of bits from the address are used as an "index" into the cache. The index selects a particular row within the two-dimensional array, and therefore the number of address bits required for the index is determined by the number of rows configured into the cache. The act of selecting a row via an index is referred to as "indexing". The addresses associated with bytes stored in the multiple cache lines of a row are examined to determine if any of the addresses stored in the row match the requested address. If a match is found, the access is said to be a "hit", and the cache provides the associated bytes. If a match is not found, the access is said to be a "miss". When a miss is detected, the bytes are transferred from the memory system into the cache. The tag addresses (or tags) associated with bytes stored in the cache are also stored. Since the index portion of the address identifies the row of the cache at which the cache line is stored, access to the cache line implies that the index portion of the access address matches the index portion of the tag address. Therefore, the tag address stored within the cache may exclude the index portion of the address (as well as the offset portion).

The cache lines configured into a row form the columns of the row. Each cache line within a row is referred to as a "way"; multiple ways comprise a row. The way is selected by providing a way value to the cache. The way value is determined by examining the tags for a row and finding a match between one of the tags and the requested address. A cache designed with one way per row is referred to as a "direct-mapped cache". In a direct-mapped cache, the tag must be examined to determine if an access is a hit, but the tag examination is not required to select which bytes are transferred to the outputs of the cache.

Microprocessors may be configured with a single cache which stores both instructions and data, but are more typically configured with separate instruction and data caches. Instruction caches are accessed with a fetch address, and bytes from the corresponding cache line which are subsequent to the byte identified by the address are conveyed into the instruction processing pipeline along with the identified byte. In other words, the bytes which are stored at higher order memory locations within the cache line are conveyed along with the identified byte. Bytes prior to the identified byte within the cache line are discarded. The term "instruction block" will be used herein to refer to the bytes conveyed when a fetch address accesses the instruction cache. The bytes within the instruction block comprise one or more instructions which are to be executed in the instruction processing pipeline. The instruction block begins at the byte identified by the corresponding fetch address and ends at either the end of the cache line or at a branch instruction within the cache line for which a branch prediction unit is storing a branch prediction.

As advances in transistor fabrication technologies have both decreased the size of the transistor and increased the switching speed of the transistor, microprocessor designers have been able to include larger caches within the microprocessor and have been able to design higher frequency (i.e. shorter clock cycle) microprocessors. Including larger caches may increase the performance of the microprocessor. The larger caches may store more data and/or instructions, thereby advantageously increasing the hit rate. Unfortunately, increasing the size of the caches generally creates a greater cache access time. Cache access time may increase to the point of becoming the limiting factor upon clock cycle time. Alternatively, cache access time may increase to a larger time interval than the clock cycle time. The term "cache access time" refers to the interval of time required from the presentation of an address to the cache until the corresponding bytes are available for use by the microprocessor. For example, a set associative cache access time includes time for indexing the cache storage, time for comparing the tags to the access address in order to select a way, and time for conveying the selected data from the cache.

Increasing cache access time is particularly deleterious to instruction caches employed within high frequency microprocessors. In order to supply sufficient instructions to the instruction processing pipeline, the instruction cache is characterized by a large bandwidth (i.e. number of instructions fetched per second). Increasing the cache access time reduces bandwidth, particularly when cache access time becomes longer than the clock cycle time of the microprocessor. In these cases, the reduced bandwidth may result in instructions not being provided to the instruction processing pipeline of the microprocessor during each consecutive clock cycle. Bandwidth may be increased by increasing the cache line size such that more bytes are accessed with each address. Unfortunately, branch instructions may cause many of the additional bytes to be discarded. In the x86 instruction set, for example, branches occur once every four instructions on the average. Additionally, branch instructions are typically taken (i.e. cause instruction fetch to transfer to the target address of the branch instruction) 60–70% of the time. The average x86 instruction is about 3 bytes long. Therefore, on the average, every 12 bytes a branch instruction occurs and is often taken. Bytes subsequent to the branch instruction are discarded when the branch is taken. Performance is not increased by the increased bandwidth made possible by a larger instruction cache line size in these cases. A better method for increasing the bandwidth of instruction caches is desired.

SUMMARY OF THE INVENTION

The problems outlined above are in large part solved by a microprocessor in accordance with the present invention. The microprocessor includes an instruction cache having a cache access time greater than the clock cycle time employed by the microprocessor. The instruction cache is banked, and access to alternate banks is pipelined. In this manner, instructions may be read from the instruction cache during each clock cycle. Advantageously, banking the instruction cache may increase instruction cache bandwidth to provide instructions during each clock cycle. Performance of the microprocessor may be increased by taking advantage of the increased instruction cache bandwidth.

In order to generate fetch addresses for the instruction cache during each clock cycle, the microprocessor includes a branch prediction unit. The branch prediction unit provides a branch prediction in response to each fetch address. The branch prediction predicts a non-consecutive instruction block within the instruction stream being executed by the microprocessor. Access to the consecutive instruction block is initiated prior to completing access to a current instruction block. Therefore, a branch prediction for the consecutive instruction block is produced as a result of fetching a prior instruction block. A branch prediction produced as a result of fetching the current instruction block predicts the non-consecutive instruction block, and the fetch address of the non-consecutive instruction block is provided to the instruction cache access pipeline. Even in the presence of branches, an instruction fetch address can be generated during each clock cycle using the branch prediction unit described herein. Advantageously, the branch prediction unit enhances the operation of the pipelined instruction cache by providing fetch addresses during each clock cycle. The additional fetch bandwidth may be used more optimally by fetching the predicted instruction stream on a clock cycle by clock cycle basis, even though multiple clock cycles are used to access the instruction cache.

Broadly speaking, the present invention contemplates a microprocessor comprising an instruction cache and a branch prediction unit. The instruction cache stores blocks of instructions, and has a cache access time greater than a clock cycle time employed by the microprocessor. Coupled to the instruction cache, the branch prediction unit is coupled to receive a first fetch address identifying a first instruction block within an instruction stream concurrent with the instruction cache receiving the first fetch address. The branch prediction unit is further configured to predict a second fetch address identifying a second instruction block within the instruction stream in response to the first fetch address. At least a third instruction block is included in the instruction stream between the first instruction block and the second instruction block.

The present invention further contemplates a method for fetching instructions from an instruction cache having a cache access time greater than a clock cycle time of a microprocessor. A first fetch address identifying a first instruction block is generated and presented to the instruction cache during a first clock cycle. A second fetch address identifying a second instruction block is generated and presented to the instruction cache during a second clock cycle succeeding the first clock cycle. Branch prediction information provided in response to the first fetch address is analyzed to generate a third fetch address identifying a third instruction block. The third fetch address is presented to the instruction cache during a third clock cycle subsequent to the second clock cycle.

Moreover, the present invention contemplates a microprocessor comprising an instruction cache and a branch prediction unit. The instruction cache is configured to store a first instruction block, a second instruction block, and a third instruction block. The first instruction block is prior to the second instruction block within an instruction stream, while the second instruction block is prior to the third instruction block in the instruction stream. Coupled to the instruction cache, the branch prediction unit is configured to generate a first branch prediction in response to fetching the first instruction block from the instruction cache. The first branch prediction corresponds to a branch instruction within the second instruction block, and predicts a fetch address identifying the third instruction block.

BRIEF DESCRIPTION OF THE DRAWINGS

Other objects and advantages of the invention will become apparent upon reading the following detailed description and upon reference to the accompanying drawings in which.

Figure 1:
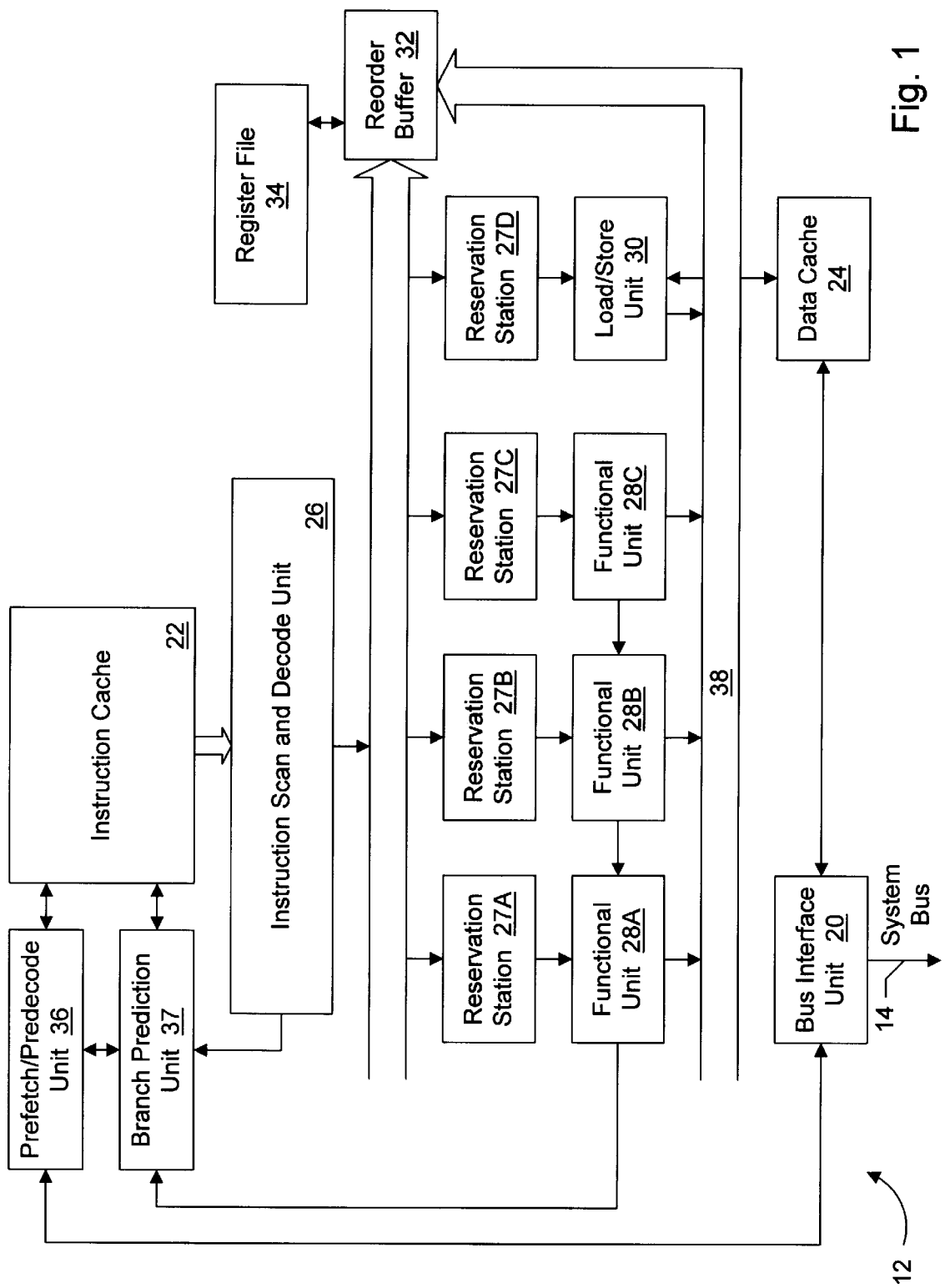
FIG. 1 is a block diagram of one embodiment of a microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, one embodiment of a superscalar microprocessor 12 is shown. Microprocessor 12 includes a bus interface unit 20, an instruction cache 22, a data cache 24, an instruction scan and decode unit 26, a plurality of reservation stations 27A–27D, a plurality of functional units 28A–28C, a load/store unit 30, a reorder buffer 32, a register file 34, a prefetch/predecode unit 36, and a branch prediction unit 37. The plurality of functional units will be collectively referred to herein as functional units 28, and the plurality of reservation stations will be collectively referred to as reservation stations 27. Bus interface unit 20 is coupled to prefetch/predecode unit 36, which is further coupled to instruction cache 22. Additionally, bus interface unit 20 is coupled to data cache 24 and to a system bus 14. Instruction cache 22 is further coupled to instruction scan and decode unit 26, which is in turn coupled to reservation stations 27, reorder buffer 32, and register file 34. Reservation stations 27A–27C are coupled to respective functional units 28A–28C, and reservation station 27D is coupled to load/store unit 30. Reorder buffer 32, reservation stations 27, functional units 28, and load/store unit 30 are each coupled to a result bus 38 for forwarding of execution results. Load/store unit 30 is coupled to data cache 24. Finally, functional units 28 and instruction scan and decode unit 26 are coupled to branch prediction unit 37.

Generally speaking, microprocessor 12 includes circuitry configured to operate within a particular clock cycle time. Instruction cache 22, however, is characterized by a cache access time greater than the particular clock cycle time. In order to produce sufficient instruction fetch bandwidth, instruction cache 22 is configured into banks which can be separately accessed in a pipelined fashion (i.e. a second instruction block fetch is initiated prior to completing a first instruction block fetch). Consecutive instruction blocks may be fetched from different banks, thereby allowing instruction blocks to be provided to instruction scan and decode unit 26 during each clock cycle as long as the consecutive instruction blocks are not stored in the same instruction cache bank. Advantageously, instruction cache bandwidth may be increased to the point of supplying instructions to instruction scan and decode unit 26 during each clock cycle even though the cache access time of instruction cache 22 exceeds the clock cycle time.

The consecutive instruction blocks are consecutive within the predicted instruction stream being executed by microprocessor 12. The term "instruction stream" refers to an ordered set of instructions coded into a program. The instructions are intended to be executed in the order listed, although any order which produces equivalent results may be used. A computer program includes at least one instruction stream, and may include many instruction streams. A "predicted instruction stream" is an instruction stream formed by predicting the outcome of branch instructions included in the instruction stream. Branches may be predicted as "taken", in which the target address of the branch instruction is selected for instruction fetching. Conversely, instructions may be predicted as "not taken", in which the address sequential to the branch instruction (i.e. the instruction stored consecutive to the branch instruction in memory) is selected. Reorder buffer 32 stores instructions according to their order within the predicted instruction stream. Instruction blocks are consecutive within the instruction stream if instruction within the blocks are consecutive in the code sequence being executed. Consecutive instruction blocks may not be stored in consecutive memory locations, but instead may be linked by a branch instruction (i.e. a second instruction block consecutive to a first instruction block may be stored at the target address of a branch instruction within the first instruction block).

Instruction cache 22 is organized into banks. A bank is a set of memory locations which may be accessed separately from another bank. The banks are electrically isolated from one another such that different accesses may be performed concurrently to each of the banks. The different accesses do not interfere with one another. Essentially, each of the banks operates similar to an independent storage array even though the banks are encapsulated within the instruction cache storage. According to one embodiment, each bank stores a number of rows of instruction cache 22. Each instruction block is therefore stored in at most one bank. Consecutively fetched instruction blocks are stored in different banks of instruction cache 22. The consecutively fetched instruction blocks are conveyed to instruction scan and decode unit 26 during consecutive clock cycles. Advantageously, instruction cache 22 is capable of supplying instruction blocks during consecutive clock cycles despite a cache access time greater than the clock cycle time.

Branch prediction unit 37 provides instruction fetch addresses to instruction cache 22. Since consecutive instruction blocks within the instruction stream are fetched in a pipelined fashion, branch prediction unit 37 employs an improved branch prediction mechanism. In some conventional branch prediction mechanisms, a prediction of the fetch address corresponding to the next consecutive instruction block is stored in a branch prediction storage so that the prediction is accessed when the instruction block is accessed from instruction cache 22. More particularly, the fetch address presented to instruction cache 22 is concurrently presented to the branch prediction storage. The prediction is based upon a branch instruction or instructions within the instruction block corresponding to the fetch address. Typically, the access time of the branch prediction storage is comparable to that of instruction cache 22. The conventional mechanism is operable for microprocessors which employ instruction caches having a cache access time less than or equal to the clock cycle time. However, the conventional mechanism is insufficient for microprocessor 12. Microprocessor 12 fetches the next consecutive instruction block in a pipelined fashion with the current instruction block. Therefore, the next consecutive instruction block is identified prior to retrieving the branch prediction information for the current instruction block.

The branch prediction mechanism employed by branch prediction unit 37 stores, in addition to a prediction the next consecutive instruction block, a prediction for a block which is non-consecutive to the current instruction block. Branch prediction unit 37 uses the non-consecutive prediction, when the current instruction block is accessed, to form a branch prediction for a subsequent instruction block. For example, instruction cache 22 may have a cache access time which is twice the clock cycle time of microprocessor 12. For this embodiment, branch prediction unit 37 stores a prediction for the next consecutive instruction block as well as the instruction block following the next consecutive instruction block (i.e. the second consecutive instruction block). As an instruction block is fetched during each instruction cache access, a prediction for the second consecutive instruction block is formed. In this manner, instruction fetch addresses can be generated each clock cycle even though multiple clock cycles are used to access branch prediction information. Upon detection of a branch misprediction, a corrected fetch address is presented to instruction cache 22 and branch prediction unit 37. Branch prediction unit 37 uses both the consecutive and non-consecutive branch predictions corresponding to the corrected fetch address to fetch the correct instruction stream. A bubble may result in the fetching of instructions after a mispredicted branch, as described in more detail below.

According to one embodiment, the branch prediction storage within branch prediction unit 37 is structured identically to instruction cache 22. In other words, each cache line within instruction cache 22 corresponds to a branch prediction storage location within the branch prediction storage. The branch prediction storage location stores branch prediction information identifying the next consecutive instruction block and the non-consecutive instruction block corresponding to an instruction block within that cache line.

Prefetch/predecode unit 36 is included for predecoding instructions prior to their storage in instruction cache 22. Predecoding may be employed in embodiments of microprocessor 12 which execute x86 instructions. Because the instructions are of different byte lengths, prefetch/predecode unit 36 may indicate the beginning and end of each instruction within an instruction cache line. This information may be used by instruction scan and decode unit 26 to more efficiently route instructions to reservation stations 27. Additional predecode data may be generated as well.

In the embodiment shown, instruction scan and decode unit 26 decodes each instruction fetched from instruction cache 22. Instruction scan and decode unit 26 dispatches each instruction to a reservation station 27A–27D coupled to a functional unit 28 or load/store unit 30 which is configured to execute the instruction. Instruction scan and decode unit 26 also detects the register operands used by the dispatched instructions and requests these operands from reorder buffer 32 and register file 34. In one embodiment, functional units 28 are symmetrical execution units. Symmetrical execution units are each configured to execute a particular subset of the instruction set employed by microprocessor 12. The subsets of the instruction set executed by each of the symmetrical execution units are the same. In another embodiment, functional units 28 are asymmetrical execution units configured to execute dissimilar instruction subsets. For example, functional units 28 may include a branch execute unit for executing branch instructions, one or more arithmetic/logic units for executing arithmetic and logical instructions, and one or more floating point units for executing floating point instructions. Instruction scan and decode unit 26 dispatches an instruction to a functional unit 28 or load/store unit 30 which is configured to execute that instruction. As used herein, the term "dispatch" refers to conveying an instruction to an appropriate execution unit or load/store unit for execution of the instruction. The instruction may be dispatched into a corresponding reservation station 27A–27D for storage until the operands of the instruction are provided and the unit is ready to execute the instruction.

Instruction scan and decode unit 26 is further configured to detect a branch instruction which was not predicted by branch prediction unit 37. An instruction block is transmitted to instruction scan and decode block 26 along with an indication of the position within the instruction block of the branch instruction which was predicted. The position of the predicted instruction is included in the branch prediction information stored by branch prediction unit 37. If a branch instruction is decoded and the branch instruction is not the branch instruction predicted for the instruction block, instruction scan and decode unit 26 informs branch prediction unit 37 that a misprediction has occurred.

Still further, functional units 28 detect the execution of a branch instruction for which the prediction is incorrect. The prediction formed by branch prediction unit 37 for a particular branch instruction is conveyed with the branch instruction to the executing functional unit. If the branch is mispredicted, functional units 28 inform branch prediction unit 37. Corrective actions may then be taken to fetch the appropriate instructions.

Load/store unit 30 provides an interface between functional units 28 and data cache 24. Load and store memory operations are performed by load/store unit 30 to data cache 24. Additionally, memory dependencies between load and store memory operations are detected and handled by load/store unit 30.

Reservation stations 27 are provided for storing instructions whose operands have not yet been provided. An instruction is selected from those stored in the reservation stations for execution if: (1) the operands of the instruction have been provided, and (2) the instructions which are prior to the instruction being selected have not yet received operands. It is noted that a centralized reservation station may be included instead of separate reservations stations. The centralized reservation station is coupled between instruction scan and decode unit 26, functional units 28, and load/store unit 30. Such an embodiment may perform the dispatch function within the centralized reservation station.

Microprocessor 12 supports out of order execution, and employs reorder buffer 32 for storing execution results of speculatively executed instructions and storing these results into register file 34 in program order, for performing dependency checking and register renaming, and for providing for mispredicted branch and exception recovery. When an instruction is decoded by instruction scan and decode unit 26, requests for register operands are conveyed to reorder buffer 32 and register file 34. In response to the register operand requests, one of three values is transferred to the reservation station 27 which receives the instruction: (1) the value stored in reorder buffer 32, if the value has been speculatively generated; (2) a tag identifying a location within reorder buffer 32 which will store the result, if the value has not been speculatively generated; or (3) the value stored in the register within register file 34, if no instructions within reorder buffer 32 modify the register. Additionally, a storage location within reorder buffer 32 is allocated for storing the results of the instruction being decoded by instruction scan and decode unit 26. The storage location is identified by a tag, which is conveyed to the unit receiving the instruction. It is noted that, if more than one reorder buffer storage location is allocated for storing results corresponding to a particular register, the value or tag corresponding to the last result in program order is conveyed in response to a register operand request for that particular register.

When functional units 28 or load/store unit 30 execute an instruction, the tag assigned to the instruction by reorder buffer 32 is conveyed upon result bus 38 along with the result of the instruction. Reorder buffer 32 stores the result in the indicated storage location. Additionally, reservation stations 27 compare the tags conveyed upon result bus 38 with tags of operands for instructions stored therein. If a match occurs, the unit captures the result from result bus 38 and stores it with the corresponding instruction. In this manner, an instruction may receive the operands it is intended to operate upon. Capturing results from result bus 38 for use by instructions is referred to as "result forwarding".

Instruction results are stored into register file 34 by reorder buffer 32 in program order. Storing the results of an instruction and deleting the instruction from reorder buffer 32 is referred to as "retiring" the instruction. By retiring the instructions in program order, recovery from incorrect speculative execution may be performed. For example, if an instruction is subsequent to a branch instruction whose taken/not taken prediction is incorrect, then the instruction may be executed incorrectly. When a mispredicted branch instruction or an instruction which causes an exception is detected, reorder buffer 32 discards the instructions subsequent to that instruction. Instructions thus discarded are also flushed from reservation stations 27, functional units 28, load/store unit 30, and instruction scan and decode unit 26.

Register file 34 includes storage locations for each register defined by the microprocessor architecture employed by microprocessor 12. For example, microprocessor 12 may employ the x86 microprocessor architecture. For such an embodiment, register file 34 includes locations for storing the EAX, EBX, ECX, EDX, ESI, EDI, ESP, and EBP register values.

Data cache 24 is a high speed cache memory configured to store data to be operated upon by microprocessor 12. It is noted that data cache 24 may be configured into a set-associative or direct-mapped configuration.

Bus interface unit 20 is configured to effect communication between microprocessor 12 and devices coupled to system bus 14. For example, instruction fetches which miss instruction cache 22 may be transferred from main memory by bus interface unit 20. The instructions are conveyed to prefetch/predecode unit 36 for predecoding prior to storing the instructions into instruction cache 22. Similarly, data requests performed by load/store unit 30 which miss data cache 24 may be transferred from main memory by bus interface unit 20. Additionally, data cache 24 may discard a cache line of data which has been modified by microprocessor 12. Bus interface unit 20 transfers the modified line to main memory.

It is noted that instruction scan and decode unit 26 may be configured to dispatch an instruction to more than one execution unit. For example, in embodiments of microprocessor 12 which employ the x86 microprocessor architecture, certain instructions may operate upon memory operands. Executing such an instruction involves transferring the memory operand from data cache 24, executing the instruction, and transferring the result to memory (if the destination operand is a memory location). Load/store unit 30 performs the memory transfers, and a functional unit 28 performs the execution of the instruction.

Figure 2:
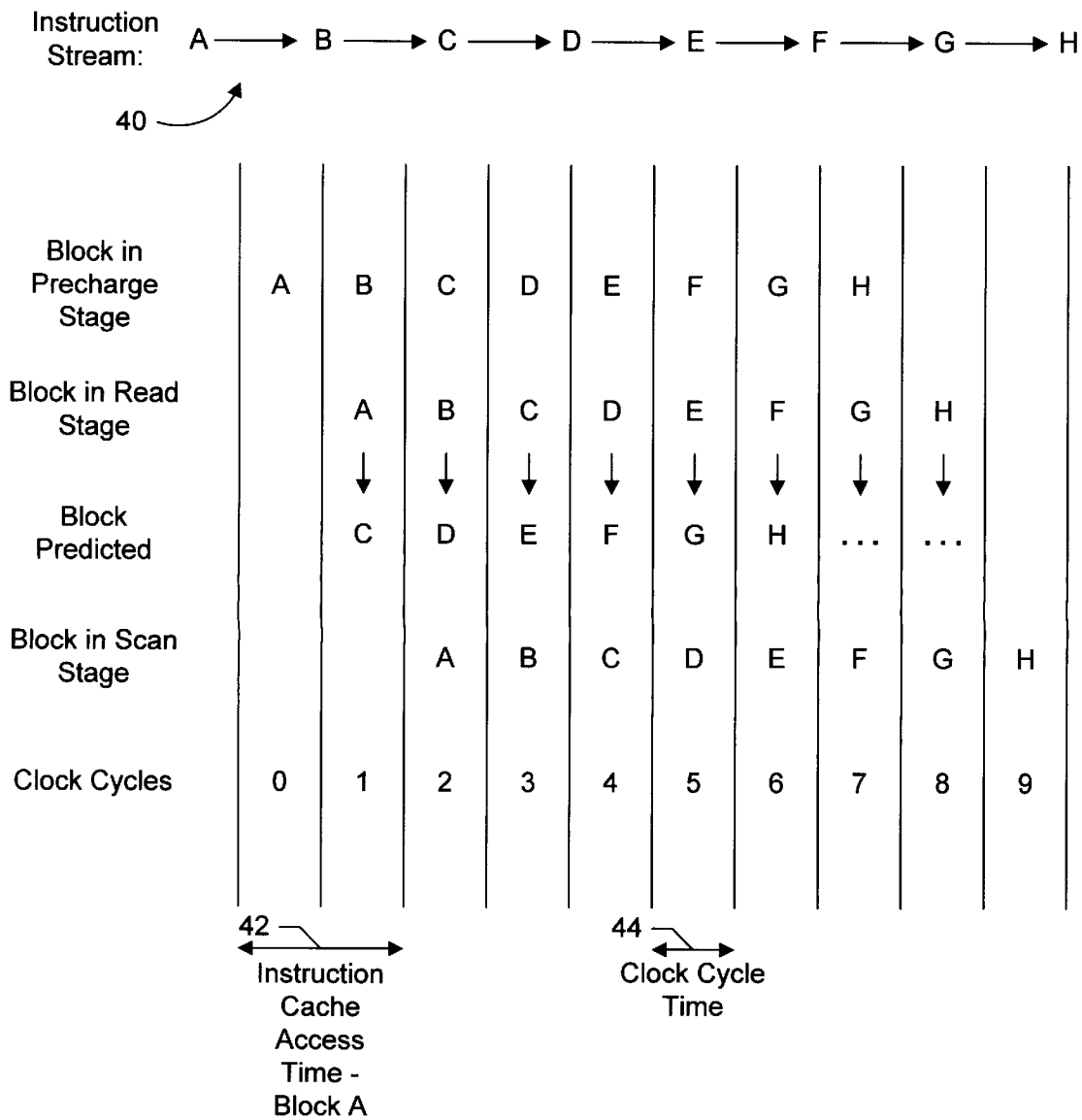
FIG. 2 is a timing diagram illustrating instruction fetching and branch prediction according to one embodiment of the instruction cache and branch prediction unit shown in FIG. 1.

Turning now to FIG. 2, a timing diagram depicting an exemplary instruction stream 40 is shown. Instruction fetching events are shown according to one embodiment of microprocessor 12. Instruction stream 40 includes a plurality of consecutive instruction blocks represented by the letters A through H. Instructions from instruction block A are foremost in instruction stream 40, followed by instructions from instruction block B, etc. For the timing diagram of FIG. 2, instruction cache access times are twice the clock cycle time (e.g. reference number 42 for block A). Clock cycle times are depicted between a pair of solid vertical lines (e.g. reference number 44). Each clock cycle is numbered at the bottom of the timing diagram (from 0 to 9).

During clock cycle 0, instruction cache 22 begins fetching instruction block A. Particularly, the bank which is accessed by block A is precharged during clock cycle 0. During clock cycle 1, block A is read from the bank. Generally, reading from a RAM array such as the instruction storage array within instruction cache 22 includes a precharge of a set of bit lines used to convey values out of the memory array to a set of sense amplifiers (sense amps) followed by a read in which the accessed memory elements are connected to the bit lines. Two bit lines are used for each stored bit, and the memory elements discharge one of the two bit lines based upon the state of the stored bit (i.e. a binary one or binary zero). Usually, precharge is performed during one half of a clock cycle and reading is performed during the other half of the clock cycle (or a self-timed array may be used in which precharge and read are performed with respect to a same clock edge using self-timed delay circuitry). Precharge may use less time than a read uses. In the case of instruction cache 22, the total time elapsing during the precharge and read portions of an access is greater than a clock cycle time. Therefore, one clock cycle is used to precharge and the next clock cycle is used to read a bank being accessed. Alternatively, a portion of the precharge clock cycle may be used to initiate the read, and the read clock cycle may be used to complete the read.

Branch prediction unit 37 includes a branch prediction storage array which is configured similar to the instruction storage array within instruction cache 22, and is accessed in response to instruction block A concurrent with fetching of the instruction block A from instruction cache 22. During clock cycle 1, branch prediction unit 37 forms branch predictions according to branch prediction information corresponding to instruction block A, thereby creating a fetch address for clock cycle 2. In particular, branch prediction information corresponding to instruction block A indicates that instruction block C is consecutive to instruction block B in instruction stream 40. Instruction cache 22 initiates access of instruction block C during clock cycle 2. Additionally, the instructions from instruction block A arrive in the scan stage of the pipeline (within instruction scan and decode unit 26) during clock cycle 2.

Also during clock cycle 1, instruction cache 22 begins fetching instruction block B in response to a fetch address generated via branch prediction information corresponding to an instruction block (not shown) prior to instruction block A within instruction stream 40. Similar to the access for instruction block A, instruction cache 22 precharges the bank accessed by instruction block B during clock cycle 1 and reads instruction block B from instruction cache 22 during clock cycle 2.

Subsequent instruction blocks are predicted and fetched as shown in FIG. 2. Branch prediction information corresponding to each fetched instruction block is used to predict an instruction block which is consecutive to the instruction block which is consecutive to the fetched instruction block. Generally, "branch prediction information" comprises information stored by branch prediction unit 37 which is used to form a predicted fetch address for fetching an instruction block from instruction cache 22. For example, branch prediction information may include a taken/not-taken prediction corresponding to a branch instruction. Additionally, branch prediction information may include a target address of the branch instruction (which is used as the predicted fetch address if the branch instruction is predicted taken). Exemplary branch prediction information used by one embodiment of microprocessor 12 is illustrated further below.

FIG. 2 illustrates that instruction cache 22 is capable of providing instruction blocks to instruction scan and decode unit 26 during each consecutive clock cycle. Instruction blocks may not be provided if instruction fetches miss instruction cache 22, if a branch misprediction is detected, or if a bank conflict is detected by branch prediction unit 37. A bank conflict occurs if a pair of consecutive instruction blocks are stored within a particular bank within instruction cache 22. Branch prediction unit 37 may resolve the bank conflict by allowing the instruction block which is the foremost of the pair within instruction stream 40 to be fetched and not allowing the other instruction block to be fetched (e.g. delaying the other instruction block for a clock cycle). Conversely, the other instruction block may be replaced by a sequential instruction block to the foremost of the pair of instruction blocks. A sequential instruction block is an instruction block stored in memory contiguous to and in a higher order memory location than another instruction block to which the sequential instruction block is referenced. For example, the sequential instruction block to the foremost of the pair of instruction blocks is the instruction block stored contiguous to the foremost block in a higher order memory location than the foremost block.

Figure 3:
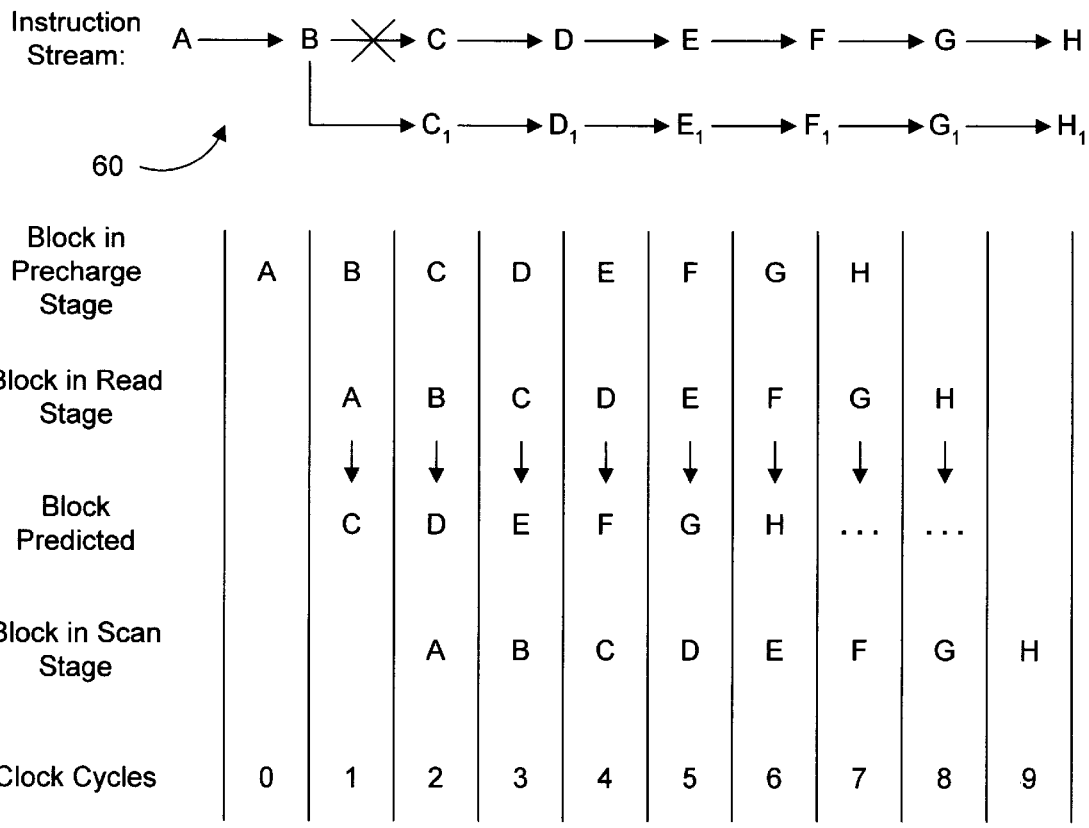
FIG. 3 is a timing diagram illustrating instruction fetching and branch prediction in the presence of a branch misprediction according to one embodiment of the instruction cache and branch prediction unit shown in FIG. 1.

Turning next to FIG. 3, a timing diagram depicting events which occur during branch mispredictions is shown. FIG. 3 depicts the events for an exemplary instruction stream 60. Exemplary instruction stream 60 is mispredicted for the instruction block following instruction block B. Instead of predicting instruction block $C_1$, instruction block C is predicted. The predicted instruction stream continues with instruction blocks D, E, F, etc. Once the branch misprediction is detected (either by instruction scan and decode unit 26 or by functional units 28), an indication of the mispredicted branch instruction is conveyed to branch prediction unit 37. In one embodiment, branch prediction unit 37 stores branch prediction information regarding each predicted branch instruction in a branch prediction buffer. A branch tag is conveyed with each predicted branch instruction. The branch tag is indicative of the position within the branch prediction buffer which stores branch prediction information corresponding to the predicted branch instruction.

Beneath instruction stream 60, a timing diagram of 8 consecutive instruction cache accesses (occurring during 10 consecutive clock cycles) is shown. The instruction cache access time and the clock cycle time are the same in the example of FIG. 3 as in the example shown in FIG. 2. Similar to FIG. 2, the predicted instruction stream is fetched and conveyed to the instruction processing pipeline of microprocessor 12 in a pipelined fashion during instruction clock cycles 0 through 9. At a later clock cycle, the misprediction of instruction block C following instruction block B is detected. The corrected instruction stream includes instruction block $C_1$, $D_1$, $E_1$, $F_1$, $G_1$, and $H_1$.

When the misprediction is detected, the instruction fetch address for instruction block $C_1$ is known (it is the correct result of executing the branch instruction within instruction block B which has a target address identifying instruction block $C_1$). However, the subsequent block ($D_1$) is not known until $C_1$ accesses the branch prediction information stored in branch prediction unit 37. As mentioned above, branch prediction information stored for block C, may include, in addition to a prediction for the non-consecutive block which is used to predict a subsequent fetch address when block $C_1$ is fetched, a prediction for the next consecutive block (e.g. $D_1$) for use during branch misprediction. Branch prediction unit 37 uses the address of the sequential instruction block to $C_1$ (denoted as $C_1+1$ in FIG. 3) as the instruction fetch address during the clock cycle following the access for block $C_1$ (i.e. clock cycle N+1 in FIG. 3). The branch prediction information for instruction blocks $C_1$ and $C_1+1$ respectively predict instruction blocks $E_1$ and $F_2$ for instruction fetch. However, the next consecutive instruction block to block $C_1$ is predicted to be $D_1$ (predicted via the branch prediction information corresponding to $C_1$). The next consecutive instruction block to block $C_1$ is taken from the branch prediction information stored with respect to $C_1$. If $D_1$ is not the sequential instruction block $C_1+1$, branch prediction unit 37 indicates that the fetch for block $C_1+1$ is invalid and fetches both instruction blocks $D_1$ and $E_1$ during subsequent clock cycles in response to branch prediction information corresponding to instruction block $C_1$. Instruction fetch is thereby resynchronized to the correct path of instruction stream 60 albeit with the introduction of a bubble in the pipeline. It is noted that if the next consecutive instruction block stored in the branch prediction information of $C_1$ indicates the sequential instruction block, then instruction blocks $E_1$ and $F_2$ would be fetched during subsequent accesses and the instructions from instruction block $C_1+1$ would be conveyed to the instruction processing pipeline of microprocessor 12. Resynchronization would thereby occur without the creation of a bubble.

Upon misprediction detection, several branch predictions are updated in branch prediction unit 37. For example, when the $C_1$ misprediction is detected, branch prediction unit 37 updates the branch prediction information for both instruction blocks A and B. Instruction block A's non-consecutive block prediction is updated to indicate instruction block $C_1$, and instruction block B's next-consecutive block prediction is updated to indicate instruction block $C_1$ as well. Subsequently, $C_1+1$ is found to be either incorrect or correct. If correct, the non-consecutive prediction of instruction block B is updated to indicate $C_1+1$. If $C_1+1$ is incorrect, the non-consecutive prediction of instruction block B is updated to indicate instruction block $D_1$.

Clock cycles N+3 through N+8 show additional instruction cache accesses for instruction blocks $E_1$, $F_1$, $G_1$ and $H_1$. These instruction cache accesses and subsequent conveyance of instructions to instruction scan and decode unit 26 depict additional instruction blocks in the corrected predicted path of instruction stream 60.

Figure 4:
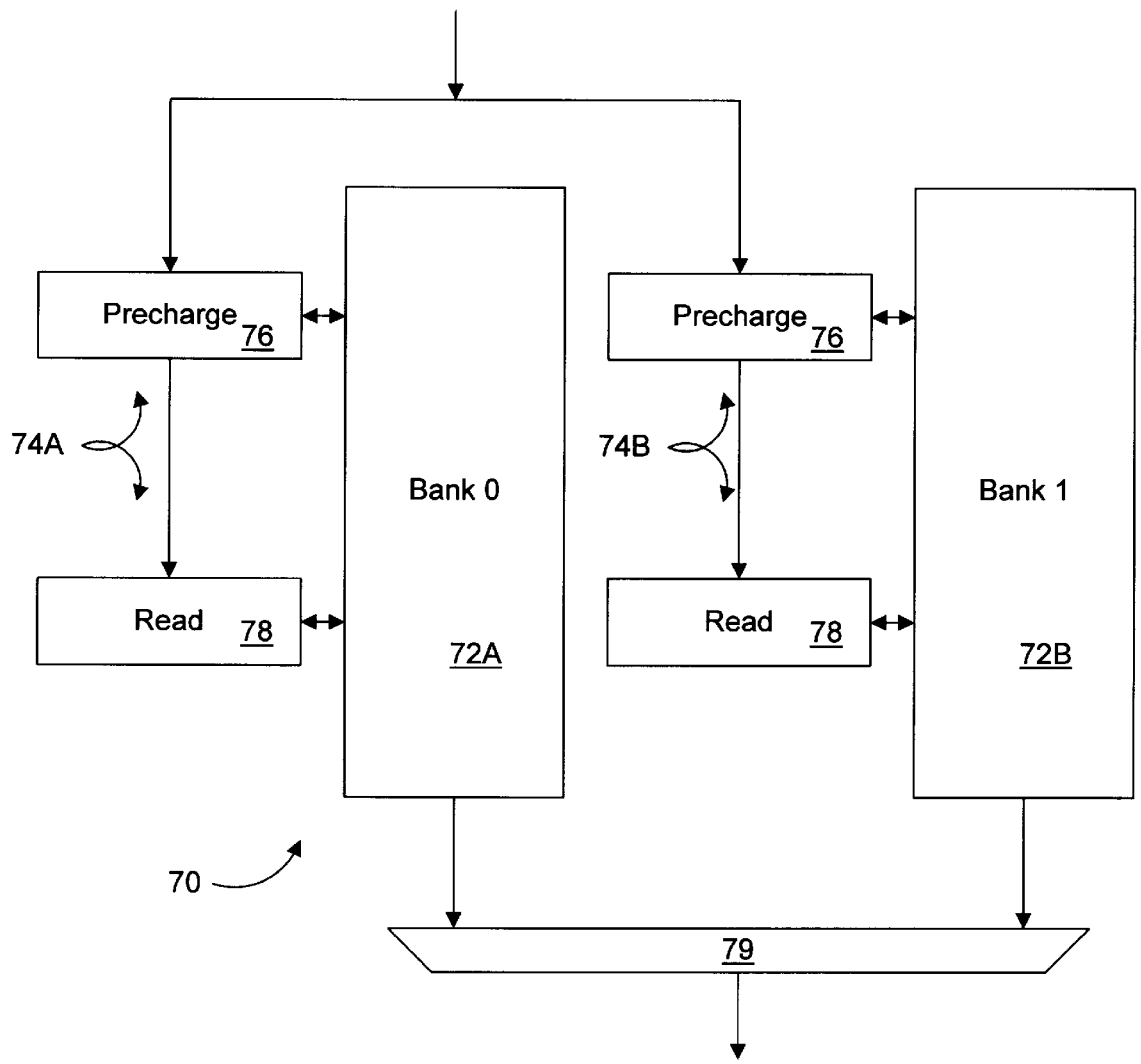
FIG. 4 is a diagram illustrating a pipelined, multiple bank storage which may be used within one embodiment of the instruction cache and branch prediction unit shown in FIG. 1.

Turning next to FIG. 4, a block diagram of one embodiment of a pipelined, multi-bank storage 70 is shown. Storage 70 may be used as the instruction cache storage within instruction cache 22, and may be used as the branch prediction storage within branch prediction unit 37 as well. Storage 70 includes a first bank of storage locations 72A and a second bank of storage locations 72B. Independent pipelines 74A and 74B are used to access banks 72A and 72B, respectively. Each pipeline 74A and 74B includes a precharge stage 76 and a read stage 78.

When an address is provided to storage 70, one of pipelines 74A–74B receives the address into its precharge stage 76. Which of pipelines 74A–74B receives the address depends upon which of banks 72A–72B is accessed by the address. According to one embodiment (as illustrated below), bank 72A stores the even indexes of storage 70 and bank 72B stores the odd indexes. Therefore, the least significant bit of the index for a given address determines which pipeline 74A–74B receives the address for this embodiment.

An address being within precharge state 76 causes a precharge of the corresponding bank 72A–72B. During the subsequent clock cycle, the read stage 78 receives the address. During the read stage, the corresponding bank 72A–72B is read to provide output. Because the precharge stage 76 and the read stage 78 both access the same resource, the corresponding bank 72A–72B, only one of the stages 76 or 78 within a particular pipeline 74A or 74B may contain an access. The other stage is idle. In one embodiment, branch prediction unit 37 ensures that only one stage of a particular pipeline 74A–74B is active during a clock cycle by detecting bank conflicts between a predicted fetch address formed during a clock cycle and the fetch address presented to instruction cache 22 during the preceding clock cycle. If a conflict is detected, the predicted fetch address is discarded and the sequential address to the fetch address presented to instruction cache 22 during the preceding clock cycle is used.

Even though only one stage of a given pipeline 74A–74B is active during a particular clock cycle, alternate stages of pipelines 74A–74B may be operating simultaneously to provide pipelined access to alternate banks. For example, precharge stage 76 of pipeline 74A may be active while read stage 78 of pipeline 74B is active.

The outputs of banks 72A and 72B are shown connected to a multiplexor 79 in FIG. 4. The output of multiplexor 79 is the output of storage 70 and is selected as the output of bank 72A or bank 72B, depending upon which bank has an active read stage 78 during a particular clock cycle. It is noted that any suitable method for providing a single output from the banks 72A–72B may be used (e.g. the outputs of banks 72A–72B may be connected together and tristate drivers used to control which bank 72A–72B is driving the output).

Figures 5, 6:
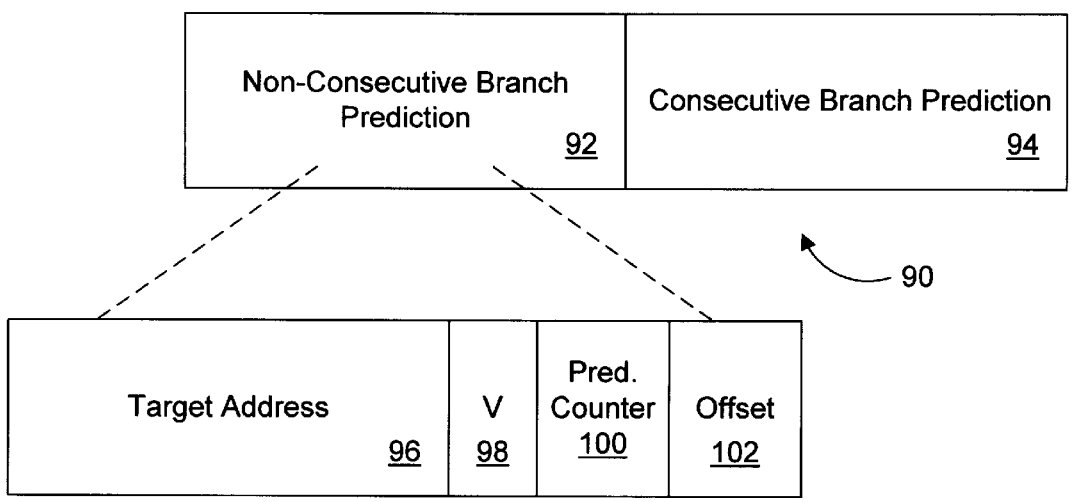
FIG. 5 is a diagram illustrating assignment of rows of the instruction cache and branch prediction storage to banks according to one embodiment of the instruction cache and the branch prediction storage.
FIG. 6 is a diagram illustrating branch prediction information stored according to one embodiment of the branch prediction unit shown in FIG. 1.

Turning next to FIG. 5, a logical diagram of the instruction storage 80 within instruction cache 22 is shown. As mentioned above, the branch prediction storage within branch prediction unit 37 may be configured similarly. Instruction cache 22 is an N-way set associative cache. Therefore, instruction storage 80 includes a plurality of rows, each row having N ways of instruction cache lines. Similarly, the branch prediction storage includes a plurality of rows, each having N ways of branch prediction information. Instruction storage 80 includes M rows, as indicated by index values 0 through M-1. As an example, instruction cache 22 may be an 8 way 32 kilobyte instruction cache having 16 byte cache lines. For this example, N is 8 and M is 256. If instruction storage 80 includes two banks as shown in FIG. 4, then each bank includes 128 rows in this example.

FIG. 5 also depicts the bank assignment of the rows of instruction storage 80 according to one embodiment. Alternate rows of instruction storage 80 are stored in each bank. In other words, rows corresponding to a least significant index bit of zero (even rows) are configured into bank 72A. Rows corresponding to a least significant index bit of one (odd rows) are configured into bank 72B.

Turning now to FIG. 6, a block diagram of exemplary branch prediction information 90 used by one embodiment of microprocessor 12 is shown. Branch prediction information 90 includes a non-consecutive branch prediction field 92 and a consecutive branch prediction field 94. The information within non-consecutive branch prediction field 92 is shown in exploded view. The information within branch prediction field 94 may be similar.

In the absence of branch mispredictions, branch prediction unit 37 uses the branch prediction stored within non-consecutive branch prediction field 92 to form branch predictions for instruction blocks within the instruction stream being executed. The branch prediction stored within non-consecutive branch prediction field 92 identifies an instruction block which is non-consecutive to the block being fetched but which is subsequent to the block being fetched within the predicted instruction stream. On the other hand, the branch prediction within consecutive branch prediction field 94 is used when a branch misprediction is detected to resynchronize instruction fetching to the correct instruction stream.

Non-consecutive branch prediction field 92 includes a target address field 96 indicating the fetch address for the non-consecutive instruction block within the predicted instruction stream. Additionally, a valid indication 98 is included, indicating that the branch prediction is valid. If the branch prediction is invalid, branch prediction unit 37 may predict the sequential cache line to the cache line storing the current instruction block.

A prediction counter field 100 is also included. According to one embodiment, the prediction counter is a two bit saturating counter which is incremented each time the corresponding branch instruction is taken and decremented each time the corresponding branch instruction is not-taken. The most significant bit of the prediction counter is the branch prediction. A taken prediction is made if the most significant bit is one, and a not-taken prediction is made if the most significant bit is zero. If a not-taken prediction is made, then the sequential cache line may be predicted (similar to if the non-consecutive branch prediction is indicated as invalid by valid indication 98).

It is noted that the branch instruction corresponding to non-consecutive branch prediction field 92 is not within the instruction block corresponding to branch prediction information 90. Instead, the corresponding branch instruction is within the instruction block which is immediately prior to the instruction block identified by non-consecutive branch prediction field 92. For example, in instruction stream 30 the corresponding branch instruction for instruction block C (predicted by branch prediction information fetched when fetching instruction block A) is within instruction block B. Offset field 102 indicates the offset of the corresponding branch instruction within the cache line storing the instruction block which ends with the corresponding branch instruction. The value of offset field 102 indicates the end of that instruction block within the cache line. For example, the offset stored in offset field 102 of the non-consecutive branch prediction for instruction block A in instruction stream 30 indicates the end of instruction block B within the cache line storing instruction block B.

It is noted that a particular cache line may store more than one instruction block. Instruction blocks end either at the last byte of the cache line (and the next consecutive instruction block is within the sequential cache line) or with a taken branch instruction (and the next consecutive instruction block is the target of the branch instruction). Therefore, a first instruction block may end at a branch within the cache line and a second instruction block may begin at the next consecutive byte to the branch instruction within the cache line. The instruction block represented by the branch prediction information is the instruction block fetched during the most recent access to the cache line.

Figure 7:
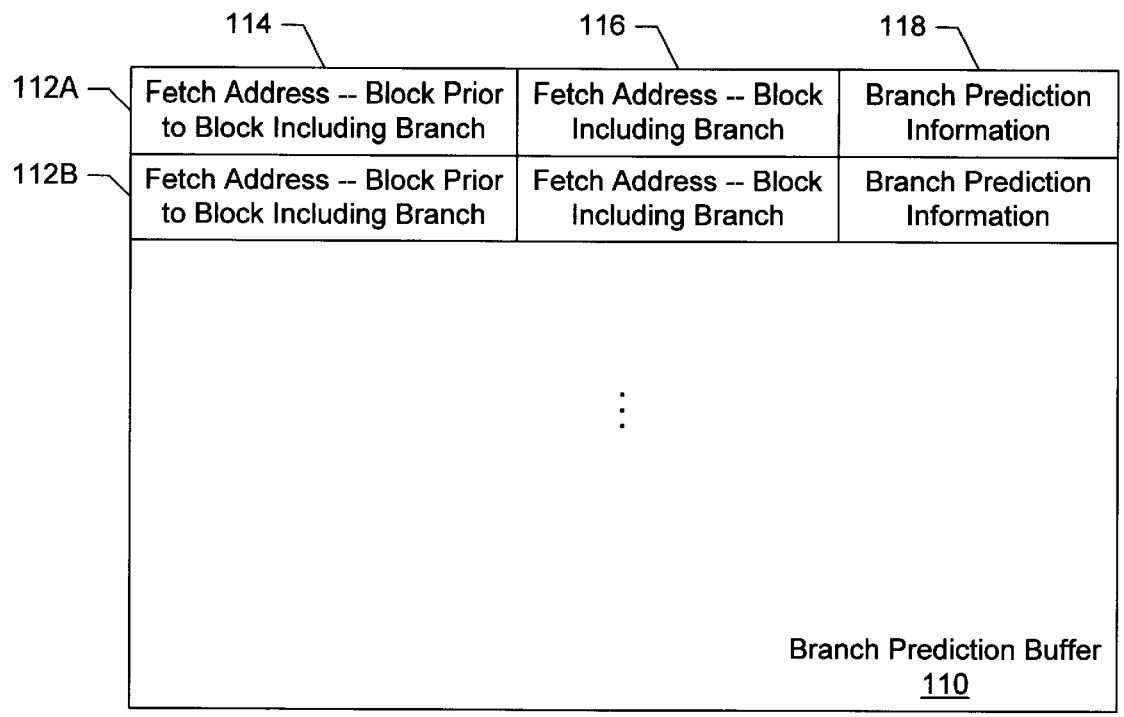
FIG. 7 is a block diagram of one embodiment of a branch prediction buffer employed within one embodiment of the branch prediction unit shown in FIG. 1.

As mentioned above, two branch prediction storage locations within the branch prediction storage employed by branch prediction unit 37 are updated upon detection of a branch misprediction. The non-consecutive branch prediction field 92 of the instruction block which generated the branch misprediction is updated, and the consecutive branch prediction field 94 of the instruction block containing the mispredicted branch is updated. FIG. 7 illustrates one embodiment of a branch prediction buffer 110 which may be employed by branch prediction unit 37 for tracking outstanding branch predictions. Branch prediction unit 37 may assign a branch tag to each fetched instruction block, identifying the location within branch prediction buffer 110 which stores the addresses of blocks which are to be updated if the branch instruction within the fetched instruction block is mispredicted (or the sequential prediction is incorrect, in the case that the fetched instruction block ends at the end of the cache line). When a branch misprediction is detected, the corresponding branch tag is conveyed to branch prediction unit 37. Branch prediction unit 37 reads the corresponding entry from branch prediction buffer 110 and updates the branch predictions according to the instruction blocks recorded therein.

Two entries 112A and 112B are shown in FIG. 7. However, as indicated by the ellipses in FIG. 7, more entries may be included. Each entry 112A–112B includes a field 114 which stores a fetch address identifying the block which predicted the block corresponding to the entry 112A–112B. In other words, the block indicated by field 114 is the block for which the non-consecutive branch prediction field 92 is to be updated if the block represented by the entry 112A–112B is mispredicted. Additionally, each entry 112A–112B includes a field 116 which stores the fetch address identifying the block which contains the branch instruction having the block represented by the entry 112A–112B as the branch instruction's target address. The consecutive branch prediction 94 for the block indicated by field 116 is to be updated if the block represented by the entry 112A–112B is mispredicted. It is noted that, if the fetch address of the branch instruction is stored in reorder buffer 32, field 116 may be eliminated and reorder buffer 32 may return the fetch address of the block for which consecutive branch prediction field 94 is to be updated upon indicating a branch misprediction.

A field 118 is included for storing the branch prediction information used to predict the block represented by the entry 112A–112B. The branch prediction information is stored both in non-consecutive branch prediction field 92 of the branch prediction information corresponding to the block identified by field 114 and in consecutive branch prediction field 94 of the branch prediction information corresponding to the block identified by field 116. The branch prediction information is updated in response to the branch prediction. The updated information may then be stored into the branch prediction fields of the indicated blocks. Additionally, the branch prediction information may be updated upon correct prediction of a branch (e.g. to increment prediction counter field 100).

Figure 8:
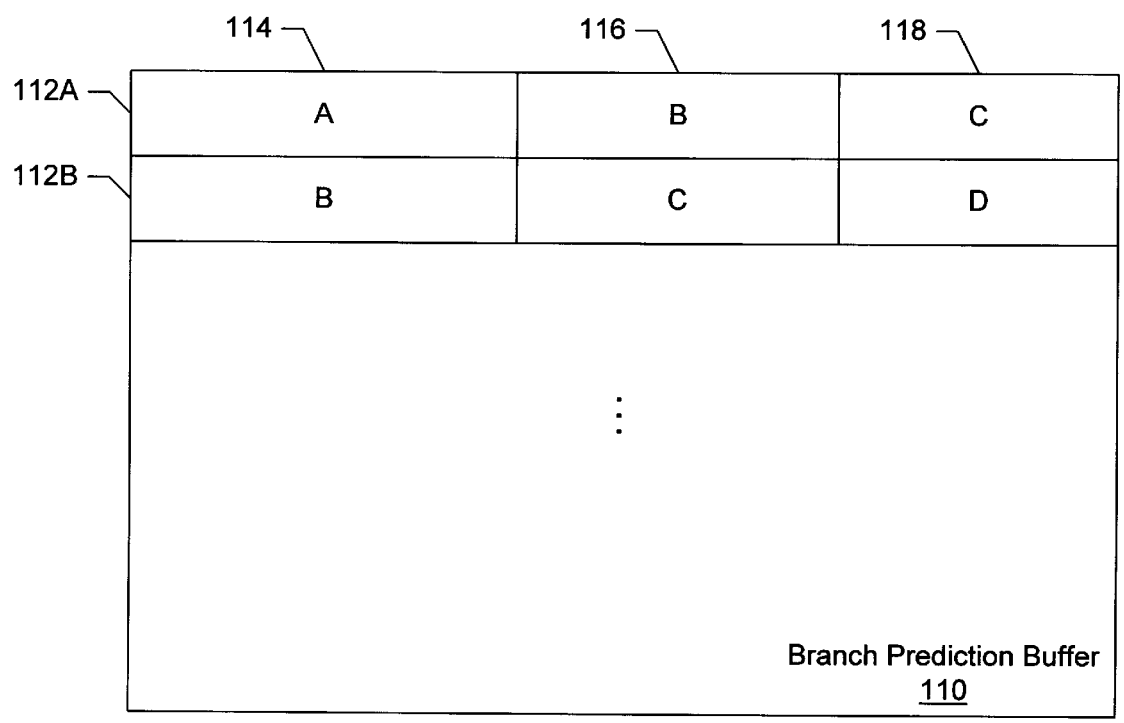
FIG. 8 is an exemplary state of the branch prediction buffer shown in FIG. 7 during a point in time of the timing diagram shown in FIG. 2.

Turning next to FIG. 8, an exemplary state of branch prediction buffer 110 after instruction block D in instruction stream 40 is fetched is shown. Entry 112A represents the prediction for instruction block C. Therefore, field 118 stores the branch prediction information used to generate the fetch address of instruction block C. Instruction block B contains the branch instruction which branches to instruction block C, and instruction block A is the instruction block which includes the prediction for instruction block C as the non-consecutive branch prediction. Similarly, entry 112B represents the prediction for instruction block D with instruction block C containing the branch instruction which branches to instruction block D and instruction block B being the instruction block which includes the prediction for instruction block D as the non-consecutive branch prediction.

The state of branch prediction buffer 110 shown in FIG. 8 may also represent the state of branch prediction buffer 110 during execution of instruction stream 60, upon detecting the misprediction of instruction block C. Other entries, not shown, would represent instruction blocks E, F, G, and H as shown in FIG. 3. Upon detecting the misprediction for instruction block C, entry 112A of branch prediction buffer 110 is read by branch prediction unit 37. The non-consecutive branch prediction of instruction block A and the consecutive branch prediction of instruction block B are both updated to predict the correct target instruction block ($C_1$). Additionally, upon fetching instruction block $C_1$, the non-consecutive branch prediction of instruction block B is updated to indicate the consecutive instruction block to $C_1$ (i.e. $D_1$).

Figure 9:
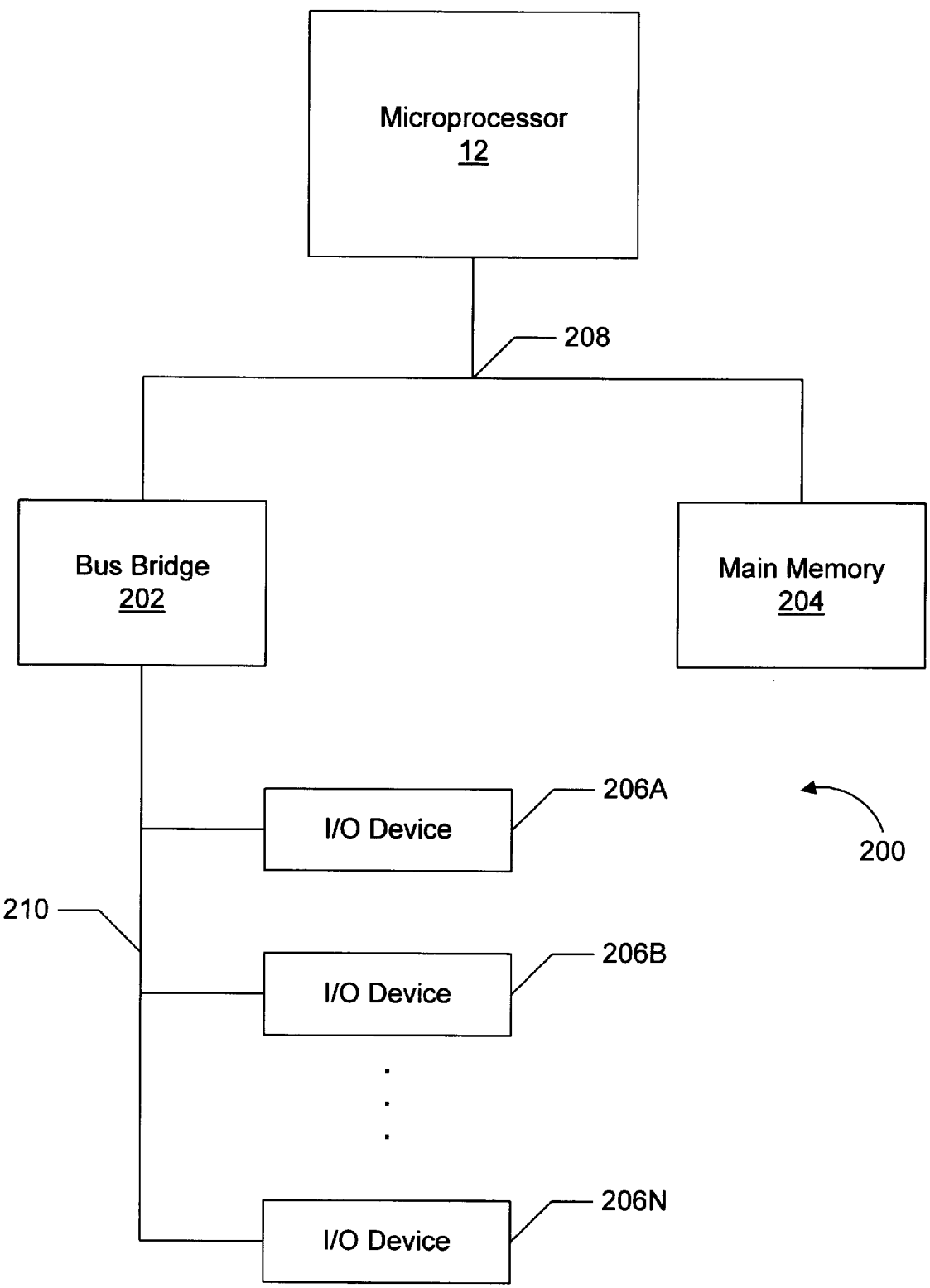
FIG. 9 is a block diagram of one embodiment of a computer system including the microprocessor shown in FIG. 1.

Turning now to FIG. 9, a computer system 200 including microprocessor 12 is shown. Computer system 200 further includes a bus bridge 202, a main memory 204, and a plurality of input/output (I/O) devices 206A–206N. Plurality of I/O devices 206A–206N will be collectively referred to as I/O devices 206. Microprocessor 12, bus bridge 202, and main memory 204 are coupled to a system bus 208. I/O devices 206 are coupled to an I/O bus 210 for communication with bus bridge 202.

Bus bridge 202 is provided to assist in communications between I/O devices 206 and devices coupled to system bus 208. I/O devices 206 typically require longer bus clock cycles than microprocessor 10 and other devices coupled to system bus 208. Therefore, bus bridge 202 provides a buffer between system bus 208 and input/output bus 210. Additionally, bus bridge 202 translates transactions from one bus protocol to another. In one embodiment, input/output bus 210 is an Enhanced Industry Standard Architecture (EISA) bus and bus bridge 202 translates from the system bus protocol to the EISA bus protocol. In another embodiment, input/output bus 210 is a Peripheral Component Interconnect (PCI) bus and bus bridge 202 translates from the system bus protocol to the PCI bus protocol. It is noted that many variations of system bus protocols exist. Microprocessor 12 may employ any suitable system bus protocol.

I/O devices 206 provide an interface between computer system 200 and other devices external to the computer system. Exemplary I/O devices include a modem, a serial or parallel port, a sound card, etc. I/O devices 206 may also be referred to as peripheral devices. Main memory 204 stores data and instructions for use by microprocessor 12. In one embodiment, main memory 204 includes at least one Dynamic Random Access Memory (DRAM) and a DRAM memory controller.

It is noted that although computer system 200 as shown in FIG. 9 includes one bus bridge 202, other embodiments of computer system 200 may include multiple bus bridges 202 for translating to multiple dissimilar or similar I/O bus protocols. Still further, a cache memory for enhancing the performance of computer system 200 by storing instructions and data referenced by microprocessor 12 in a faster memory storage may be included. The cache memory may be inserted between microprocessor 12 and system bus 208, or may reside on system bus 208 in a "lookaside" configuration. It is still further noted that the functions of bus bridge 202, main memory 204, and the cache memory may be integrated into a chipset which interfaces to microprocessor 12.

In accordance with the above disclosure, a microprocessor has been shown which includes an instruction cache having a cache access time greater than a clock cycle time of the microprocessor. The cache is banked and access to the cache is pipelined such that instructions may be provided from the cache each clock cycle as long as consecutive instruction blocks are fetched from alternate banks. Additionally, a branch prediction unit is included which stores branch predictions for an instruction block which is non-consecutive with the instruction block for which the prediction is stored. As each instruction block is read from the instruction cache, corresponding branch prediction information is read from the branch prediction storage. The non-consecutive block is predicted from the branch prediction information, and the multi-cycle cache access for the non-consecutive block is performed. Advantageously, a predicted instruction stream is read at a high bandwidth rate of one instruction block per clock cycle.

Numerous variations and modifications will become apparent to those skilled in the art once the above disclosure is fully appreciated. It is intended that the following claims be interpreted to embrace all such variations and modifications.

What is claimed is:

1. A microprocessor comprising:
   an instruction cache for storing blocks of instructions, wherein said instruction cache has a cache access time greater than a clock cycle time employed by said microprocessor; and
   a branch prediction unit coupled to said instruction cache, wherein said branch prediction unit is coupled to receive a first fetch address identifying a first instruction block within an instruction stream concurrent with said instruction cache receiving said first fetch address, and wherein said branch prediction unit is configured to predict a second fetch address identifying a second instruction block within said instruction stream in response to said first fetch address, and wherein at least a third instruction block is included in said instruction stream between said first instruction block and said second instruction block.

2. The microprocessor as recited in claim 1 wherein said instruction cache comprises a first bank and a second bank.

3. The microprocessor as recited in claim 2 wherein said first instruction block is stored in said first bank and said third instruction block is stored in said second bank.

4. The microprocessor as recited in claim 3 wherein said second instruction block is stored in said first bank.

5. The microprocessor as recited in claim 2 wherein said first bank comprises rows of said instruction cache which are indexed using even indexes.

6. The microprocessor as recited in claim 5 wherein said second bank comprises rows of said instruction cache which are indexed using odd indexes.

7. The microprocessor as recited in claim 2 wherein an access to said first bank comprises a precharge during a first clock cycle followed by a read during a second clock cycle.

8. The microprocessor as recited in claim 7 wherein said read is initiated during said first clock cycle following completion of said precharge, and wherein said read is completed during said second clock cycle.

9. The microprocessor as recited in claim 1 wherein said branch prediction unit is configured to store a first branch prediction identifying said second instruction block, wherein said first branch prediction is stored for fetching in response to said first fetch address.

10. The microprocessor as recited in claim 9 wherein said branch prediction unit is configured to store a second branch prediction identifying said third instruction block, wherein said second branch prediction is also stored for fetching in response to said first fetch address.

11. The microprocessor as recited in claim 10 wherein each of said first branch prediction and said second branch prediction are used to form fetch addresses if said first fetch address results from a branch misprediction detection.

12. The microprocessor as recited in claim 10 wherein said branch prediction unit is configured to update a storage location assigned to said first fetch address if either said first branch prediction or said second branch prediction results in a branch misprediction.

13. A method for fetching instructions from an instruction cache having a cache access time greater than a clock cycle time of a microprocessor, comprising:
   generating a first fetch address identifying a first instruction block and presenting said first fetch address to said instruction cache during a first clock cycle;
   generating a second fetch address identifying a second instruction block and presenting said second fetch address to said instruction cache during a second clock cycle succeeding said first clock cycle; and
   analyzing branch prediction information provided in response to said first fetch address to generate a third fetch address identifying a third instruction block and presenting said third fetch address to said instruction cache during a third clock cycle subsequent to said second clock cycle.

14. The method as recited in claim 13 wherein said first instruction block, said second instruction block, and said third instruction block are consecutive instruction blocks within an instruction stream.

15. The method as recited in claim 13 wherein said generating said second fetch address comprises analyzing branch prediction information provided in response to a fourth fetch address identifying a fourth instruction block.

16. The method as recited in claim 15 wherein said fourth instruction block precedes said first instruction block within an instruction stream.

17. The method as recited in claim 13 wherein said third clock cycle succeeds said second clock cycle.

18. The method as recited in claim 13 further comprising updating said branch prediction information provided in response to said first fetch address upon detecting that said third fetch address is mispredicted.

19. The method as recited in claim 18 wherein said branch prediction information provided in response to said second address includes a prediction for said third fetch address.

20. The method as recited in claim 19 further comprising updating said branch prediction information provided in response to said second fetch address upon detecting that said third fetch address is mispredicted.

21. A microprocessor comprising:
   an instruction cache configured to store a first instruction block, a second instruction block, and a third instruction block, wherein said first instruction block is prior to said second instruction block within an instruction stream, and wherein said second instruction block is prior to said third instruction block in said instruction stream; and a branch prediction unit coupled to said instruction cache, wherein said branch prediction unit is configured to generate a first branch prediction in response to fetching said first instruction block from said instruction cache, and wherein said first branch prediction corresponds to a branch instruction within said second instruction block, and wherein said first branch prediction predicts a fetch address identifying said third instruction block.

22. The microprocessor as recited in claim 21 wherein said instruction cache comprises at least a first bank and a second bank.

23. The microprocessor as recited in claim 22 wherein said first instruction block and said third instruction block are stored in said first bank.

24. The microprocessor as recited in claim 23 wherein said second instruction block is stored in said second bank.

25. The microprocessor as recited in claim 24 wherein said instruction cache has a cache access time greater than a clock cycle time of said microprocessor.

26. A computer system comprising:

a microprocessor including:

an instruction cache for storing blocks of instructions, wherein said instruction cache has a cache access time greater than a clock cycle time employed by said microprocessor; and a branch prediction unit coupled to said instruction cache, wherein said branch prediction unit is coupled to receive a first fetch address identifying a first instruction block within an instruction stream concurrent with said instruction cache receiving said first fetch address, and wherein said branch prediction unit is configured to predict a second fetch address identifying a second instruction block within said instruction stream in response to said first fetch address, and wherein at least a third instruction block is included in said instruction stream between said first instruction block and said second instruction block; and an input/output (I/O) device coupled to communicate between said computer system and another computer system to which said I/O device is couplable.

27. The computer system as recited in claim 26 wherein said I/O device comprises a modem.

28. The computer system as recited in claim 26 further comprising an audio I/O device.

29. The computer system as recited in claim 28 wherein said audio I/O device comprises a sound card.

30. A computer system comprising:

a microprocessor including:

an instruction cache configured to store a first instruction block, a second instruction block, and a third instruction block, wherein said first instruction block is prior to said second instruction block within an instruction stream, and wherein said second instruction block is prior to said third instruction block in said instruction stream; and a branch prediction unit coupled to said instruction cache, wherein said branch prediction unit is configured to generate a first branch prediction in response to fetching said first instruction block from said instruction cache, and wherein said first branch prediction corresponds to a branch instruction within said second instruction block, and wherein said first branch prediction predicts a fetch address identifying said third instruction block; and an input/output (I/O) device coupled to communicate between said computer system and another computer system to which said I/O device is couplable.

31. The computer system as recited in claim 30 wherein said I/O device comprises a modem.

32. The computer system as recited in claim 30 further comprising an audio I/O device.

33. The computer system as recited in claim 32 wherein said audio I/O device comprises a sound card.

\* \* \* \* \*